W. E. MARSHALL.
TROLLEY WHEEL.
APPLICATION FILED AUG. 26, 1911.
1,033,333.
Patented July 23, 1912.
3 SHEETS—SHEET 1.
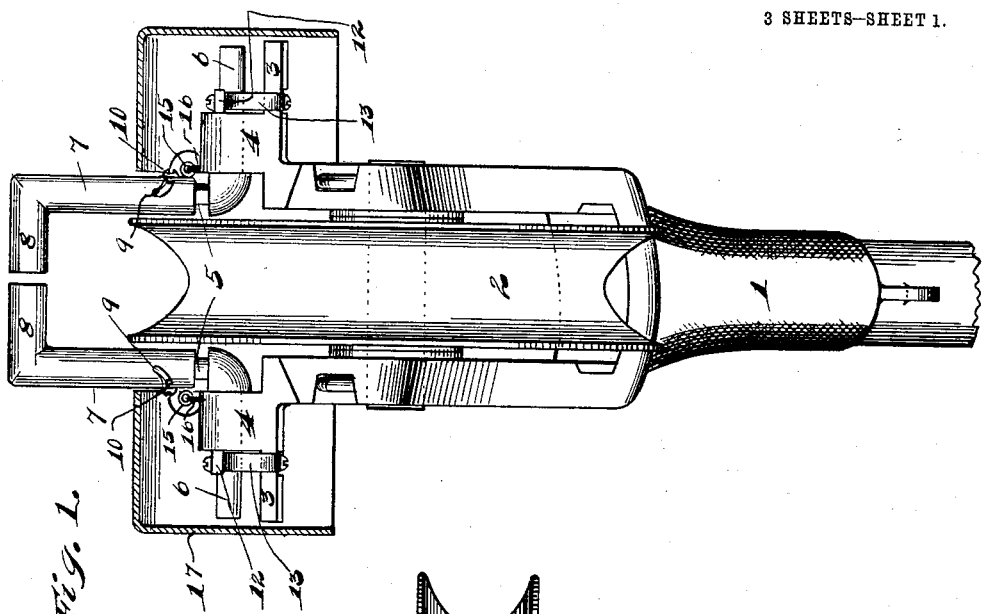
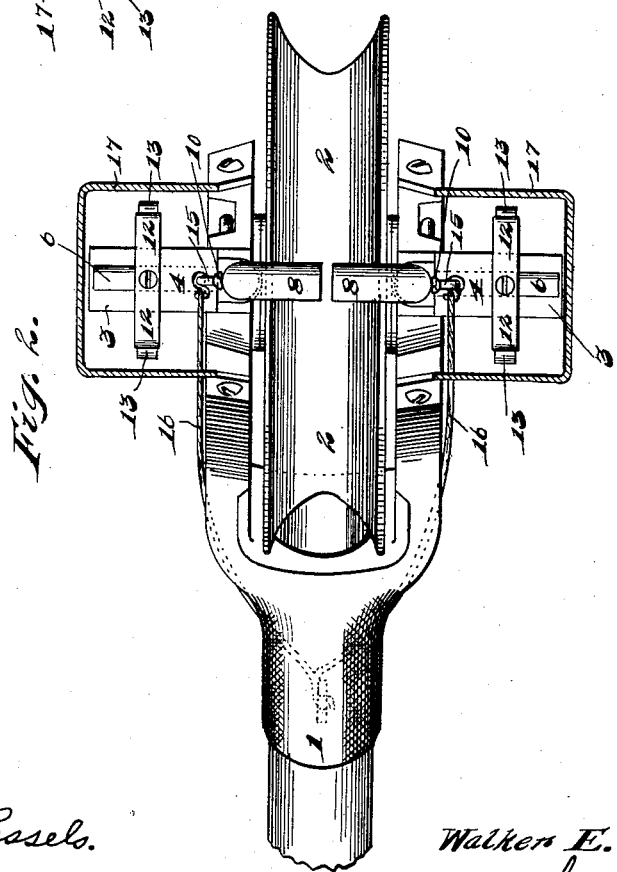
Witnesses:
C. E. Wessels.
B. G. Richards
Inventor:
Walker E. Marshall,
By Joshua R. H. Potts
his Attorney.

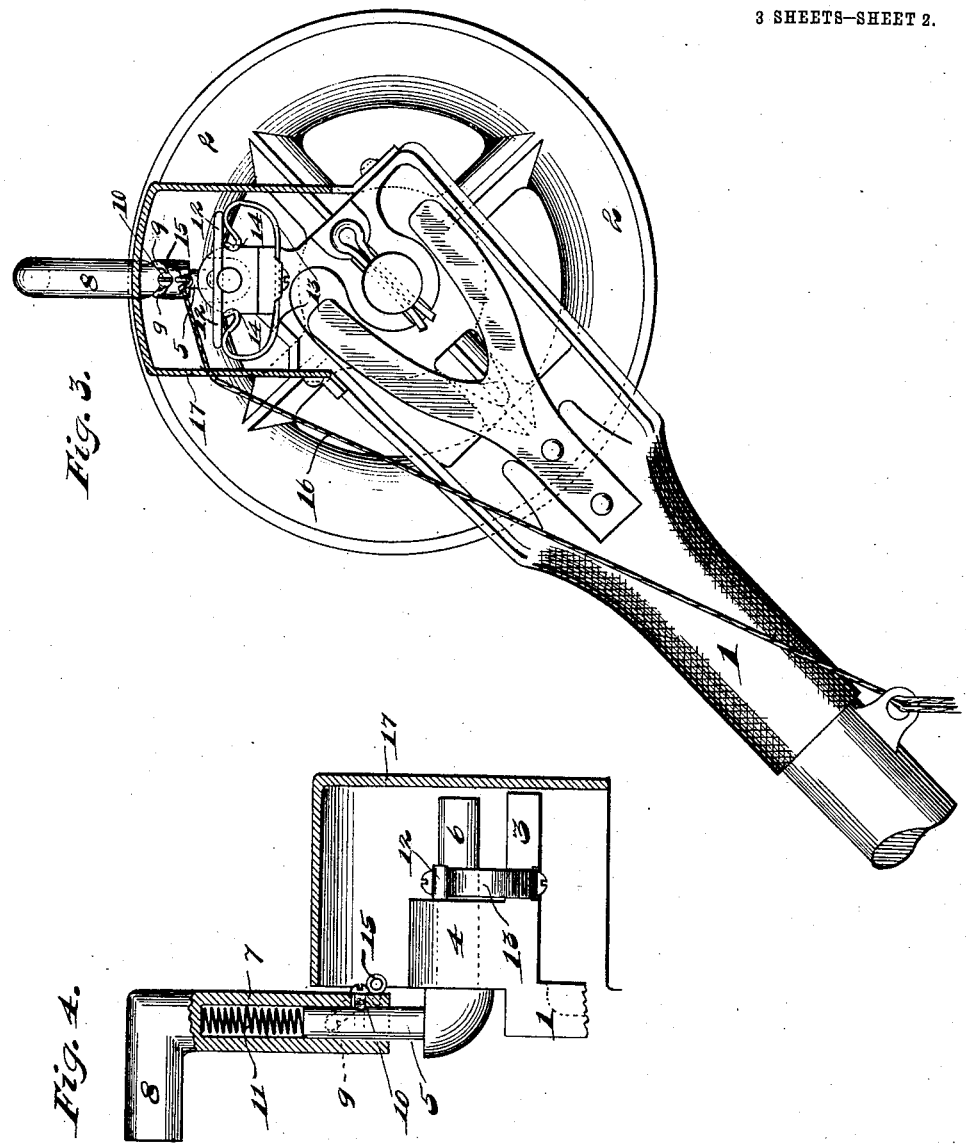

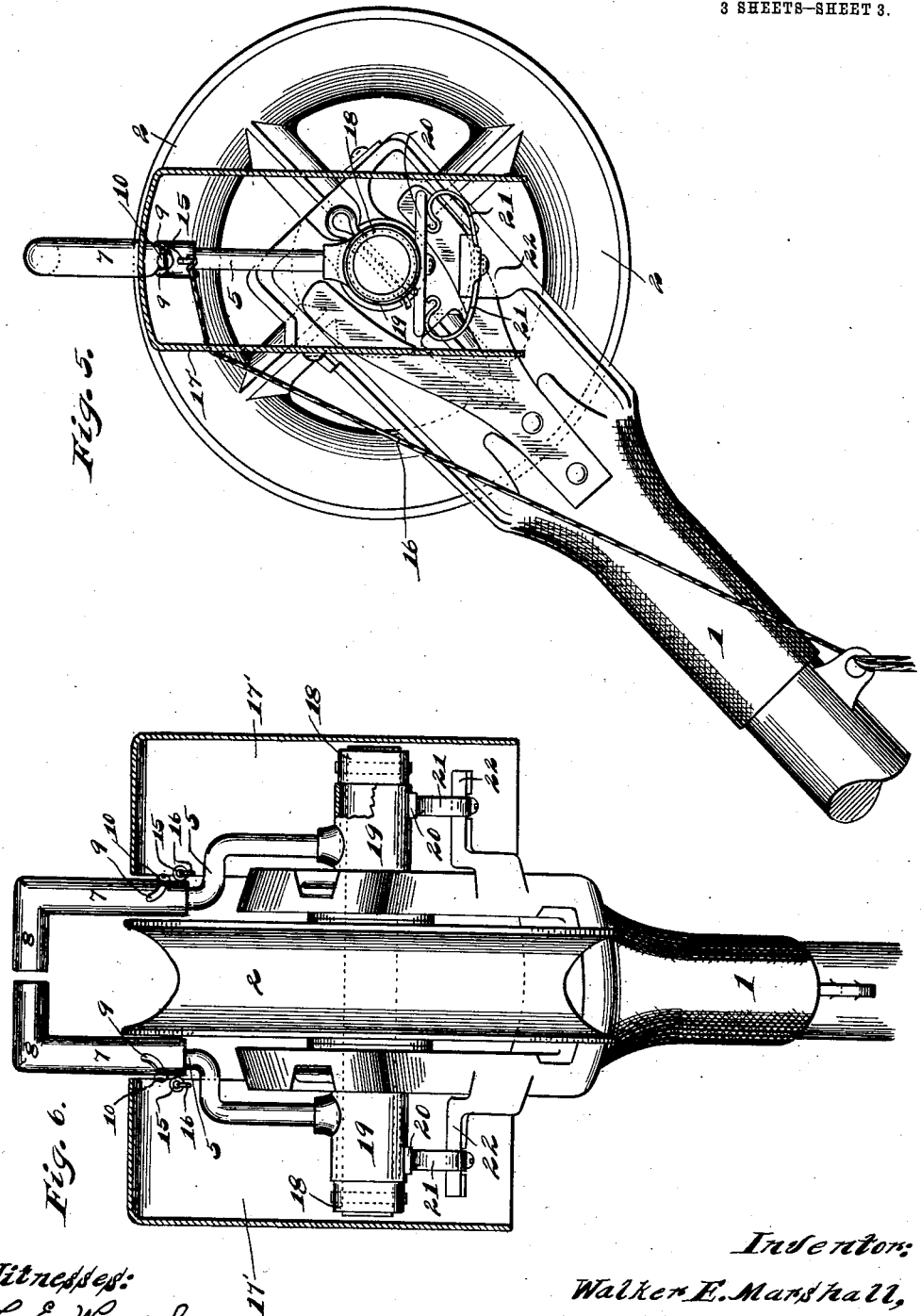

UNITED STATES PATENT OFFICE.

WALKER E. MARSHALL, OF DANVILLE, ILLINOIS, ASSIGNOR TO IRA J. SCOTT, OF DANVILLE, ILLINOIS.

TROLLEY-WHEEL.

1,033,333.

Specification of Letters Patent.

Patented July 23, 1912.

Application filed August 26, 1911. Serial No. 646,096.

*To all whom it may concern:*

Be it known that I, WALKER E. MARSHALL, a citizen of the United States, and a resident of the city of Danville, county of Vermilion, and State of Illinois, have invented certain new and useful Improvements in Trolley-Wheels, of which the following is a specification.

My invention relates to improvements in trolley wheels and has for its object the provision of a trolley wheel of improved construction and operation.

The invention consists in the combinations and arrangements of parts hereinafter described and claimed.

The invention will be best understood by reference to the accompanying drawings forming a part of this specification, and in which, Figure 1 is a rear elevation of the trolley wheel shown partially in section, Fig. 2, a top plan view thereof shown partially in section, Fig. 3, a side elevation of the trolley wheel shown partially in section, Fig. 4, an enlarged section of one of the guard arms employed in the device, Fig. 5, a side elevation shown partially in section, of a modified form of construction, and Fig. 6, a rear elevation of the modified form shown partially in section.

The preferred form of construction as illustrated in the drawings comprises a harp 1 of any usual or desired construction and a wheel 2 mounted in said harp in any usual or desired manner. At its upper portion at each side of harp 1 is provided a laterally extending lug 3 upon which is formed a bearing 4 as indicated. Upwardly extending studs 5 are provided at their lower ends with outwardly turned pivoting arms 6 which bear in bearings 4. Hollow guard arms 7 having angularly turned ends 8 are mounted on studs 5 and are provided with substantially V-shaped slots 9 in their outer walls. Each of the studs 5 carries a screw 10 projecting through the slot 9 in the corresponding guard arm 7, and a compression spring 11 is inclosed in each of the arms 7 and bears against the end of the corresponding stud 5. Each of the pivoting arms 6 carries a bearing arm 12 projecting laterally from each side thereof and contacting with a spring 13 which is secured to the under side of lug 3 as shown. Spring 13 serves to normally maintain the corresponding stud 5 in a vertical position but permits of oscillations of said stud in either direction. The ends of spring 13 are provided with lips 14 adapted to prevent the ends of arm 12 from slipping off of the ends of said spring. By this arrangement it will be observed that when the trolley encounters a suspension member or other similar obstruction, arms 7 contacting with said obstruction will be swung circumferentially with respect to wheel 2 and arms 8 also contacting with said obstruction will cause longitudinal movement of arms 7 on studs 5, and this longitudinal movement will cause rotation of arms 8 out of the path of said obstruction due to the action of pins 10 in slots 9. By making slots 9 substantially V-shaped in form as indicated provision is made for swinging of arms 7 in either direction. Thus it will be observed that the trolley will be held against accidental disengagement with the trolley wire and at the same time readily pass obstructions.

The construction set forth will be found to be a simple and efficient means for the purpose.

Arms 7 are provided with eyes 15 through which may be attached cords 16 for the purpose of moving arms 7 to inoperative positions when desired. A housing 17 is placed around bearing 4 and spring 13 to exclude dust.

In the modified form of construction illustrated in Figs. 5 and 6 the bearings 18 for the pivoting shaft of wheel 2 are extended laterally at each side of the harp 1 and are dressed on their outer sides to constitute pivoting studs. The studs 5 in this construction are provided at their lower ends with outer and downwardly extending portions mounted on hubs 19 which are given a bearing on pivoting studs 18. This furnishes a simple and convenient construction for mounting studs 5 and also necessitates the oscillations of studs 5 on the axis of wheel 2. Each of the hubs 19 carries a laterally extending bearing bar 20 which contacts with the positioning springs 21 carried by a lug 22 provided at the corresponding side of harp 1. Springs 21 thus serve as a means for normally holding studs 5 in operative positions as before. Otherwise the construction is identical with the construction illustrated in Figs. 1 to 4 inclusive with the exception of a slight difference in form in housing 17'.

While I have illustrated and described the preferred forms of construction for carrying my invention into effect, this is capable of variation and modification without departing from the spirit of the invention. I, therefore, do not wish to be limited to the precise details of construction as set forth, but desire to avail myself of such variations and modifications as come within the scope of the appended claims.

Having described my invention what I claim as new and desire to secure by Letters Patent is:

1. In a device of the class described, the combination with a harp and a trolley wheel mounted in said harp, of an upwardly extending stud pivoted on said harp to swing circumferentially with respect to said wheel; a guard arm mounted on said stud for longitudinal and rotary movement with respect to said stud; and means for causing rotary movement of said arm upon longitudinal movement thereof, substantially as described.

2. In a device of the class described, the combination with a harp and a trolley wheel mounted in said harp, of an upwardly extending stud pivoted on said harp to swing circumferentially with respect to said wheel; a guard arm telescoping said stud and provided with a slot arranged at an angle to the axis of said stud; and a pin on said stud engaging said slot, substantially as described.

3. In a device of the class described, the combination with a harp and a trolley wheel mounted in said harp, of an upwardly extending stud pivoted on said harp to swing circumferentially with respect to said wheel; a guard arm telescoping said stud and provided with a slot arranged at an angle to the axis of said stud, a pin on said stud engaging said slot; and a spring normally holding said arm in operative position, substantially as described.

4. In a device of the class described, the combination with a harp and a trolley wheel mounted in said harp; of an upwardly extending stud pivoted on said harp to swing circumferentially with respect to said wheel; a hollow guard arm telescoping said stud and provided with a substantially V-shaped slot; and a pin carried by said stud and engaging said slot, substantially as described.

5. In a device of the class described, the combination with a harp and a trolley wheel mounted in said harp; of an upwardly extending stud pivoted on said harp to swing circumferentially with respect to said wheel; a hollow guard arm telescoping said stud and provided with a substantially V-shaped slot; a compression spring in said guard arm contacting with the end of said stud; and a pin carried by said stud and engaging said slot, substantially as described.

6. In a device of the class described, the combination with a harp and a trolley wheel mounted in said harp, of an upwardly extending stud pivoted on said harp at each side thereof to swing circumferentially with respect to said wheel; guard arms mounted on said studs for longitudinal and rotary movements with respect to said studs; and means for causing rotary movements of said arms upon longitudinal movements thereof, substantially as described.

In testimony whereof I have signed my name to this specification in the presence of two subscribing witnesses.

WALKER E. MARSHALL.

Witnesses:
CHESTER W. ALBRIGHT,
ALFRED A. JOHNSON.

Copies of this patent may be obtained for five cents each, by addressing the "Commissioner of Patents, Washington, D. C."